United States Patent
Zhou et al.

(10) Patent No.: US 8,737,013 B2
(45) Date of Patent: May 27, 2014

(54) DISK DRIVE SELECTING DISTURBANCE SIGNAL FOR FEED-FORWARD COMPENSATION

(75) Inventors: Jianguo Zhou, Foothill Ranch, CA (US); Wei Xi, Mission Viejo, CA (US); Kuang-Yang Tu, Irvine, CA (US); Alain Chahwan, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 120 days.

(21) Appl. No.: 13/298,241

(22) Filed: Nov. 16, 2011

(65) Prior Publication Data

US 2013/0120870 A1 May 16, 2013

(51) Int. Cl.
*G11B 5/596* (2006.01)

(52) U.S. Cl.
USPC ..................................... 360/78.09; 360/77.04

(58) Field of Classification Search
USPC ..................... 360/55, 75, 77.04, 77.08, 78.09
See application file for complete search history.

(56) References Cited

U.S. PATENT DOCUMENTS

| | | | |
|---|---|---|---|
| 5,299,075 A | 3/1994 | Hanks | |
| 5,333,138 A | 7/1994 | Richards et al. | |
| 5,654,840 A | 8/1997 | Patton et al. | |
| 5,663,847 A | 9/1997 | Abramovitch | |
| 5,923,487 A | 7/1999 | Carlson et al. | |
| 6,115,200 A | 9/2000 | Allen et al. | |
| 6,414,813 B2 | 7/2002 | Cvancara | |
| 6,429,990 B2 | 8/2002 | Serrano et al. | |
| 6,538,839 B1 | 3/2003 | Ryan | |
| 6,614,618 B1 | 9/2003 | Sheh et al. | |
| 6,636,377 B1 | 10/2003 | Yu et al. | |
| 6,674,600 B1 | 1/2004 | Codilian et al. | |
| 6,710,966 B1 | 3/2004 | Codilian et al. | |
| 6,754,021 B2 | 6/2004 | Kisaka et al. | |
| 6,795,262 B1 | 9/2004 | Codilian et al. | |
| 6,853,512 B2 | 2/2005 | Ozawa | |
| 6,900,958 B1 | 5/2005 | Yi et al. | |
| 6,909,574 B2 | 6/2005 | Aikawa et al. | |
| 6,914,743 B1 | 7/2005 | Narayana et al. | |
| 6,950,271 B2 | 9/2005 | Inaji et al. | |
| 6,952,318 B1 | 10/2005 | Ngo | |
| 6,958,882 B2 | 10/2005 | Kisaka | |
| 6,967,804 B1 | 11/2005 | Codilian | |
| 7,139,401 B2 | 11/2006 | Culman et al. | |
| 7,142,385 B2 | 11/2006 | Shimotono et al. | |

(Continued)

FOREIGN PATENT DOCUMENTS

JP 2001-266466 9/2001

OTHER PUBLICATIONS

L. Hakansson, "The Filtered-x LMS Alogrithm", Department of Telecommunications and Signal Processing, University of Karlskrona/Rooneby, 372 25 Ronneby, Sweden, Jan. 15, 2004.

*Primary Examiner* — Tan X Dinh (57) ABSTRACT

A disk drive is disclosed comprising a disk, a head, and control circuitry comprising a servo control system operable to actuate the head over the disk. A plurality of disturbance signals is generated in response to a vibration. A plurality of correlations is generated in response to each disturbance signal and an error signal of the servo control system. At least one of the disturbance signals is selected in response to the correlations. A feed-forward compensation value is generated in response to the selected disturbance signal, and the feed-forward compensation value is applied to the servo control system to compensate for the vibration.

22 Claims, 7 Drawing Sheets

(56) References Cited

U.S. PATENT DOCUMENTS

| | | |
|---|---|---|
| 7,154,690 B1 | 12/2006 | Brunnett et al. |
| 7,382,563 B2 | 6/2008 | Saitoh et al. |
| 7,423,833 B1 | 9/2008 | Sutardja |
| 7,471,483 B1 | 12/2008 | Ferris et al. |
| 7,561,365 B2 | 7/2009 | Noguchi et al. |
| 7,595,953 B1 | 9/2009 | Cerda et al. |
| 7,596,795 B2 | 9/2009 | Ding et al. |
| 7,633,704 B2 | 12/2009 | Supino et al. |
| 7,852,588 B1 | 12/2010 | Ferris et al. |
| 8,179,626 B1 | 5/2012 | Ryan et al. |
| 2002/0153451 A1 | 10/2002 | Kiss et al. |
| 2003/0123182 A1* | 7/2003 | Inaji et al. ............... 360/78.04 |
| 2004/0080860 A1* | 4/2004 | Inaji et al. ............... 360/77.02 |
| 2004/0240101 A1* | 12/2004 | Inaji et al. ............... 360/77.02 |
| 2005/0088774 A1 | 4/2005 | Bahirat et al. |
| 2006/0291087 A1 | 12/2006 | Suh et al. |
| 2006/0291101 A1 | 12/2006 | Takaishi |
| 2008/0174900 A1 | 7/2008 | Abrishamchian et al. |
| 2009/0034116 A1* | 2/2009 | Higashino et al. ......... 360/78.06 |
| 2009/0034117 A1* | 2/2009 | Higashino ............... 360/78.06 |
| 2009/0135516 A1 | 5/2009 | Takasaki et al. |
| 2010/0061007 A1 | 3/2010 | Matsushita et al. |
| 2010/0079906 A1 | 4/2010 | Wile et al. |
| 2012/0050904 A1* | 3/2012 | Park et al. ............... 360/31 |

* cited by examiner

FIG. 3B $$Rex = \frac{e^T \cdot x}{\sqrt{e^T \cdot e}\sqrt{x^T \cdot x}}$$

DISK DRIVE SELECTING DISTURBANCE SIGNAL FOR FEED-FORWARD COMPENSATION

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the velocity of the actuator arm as it seeks from track to track.

Figure 1:
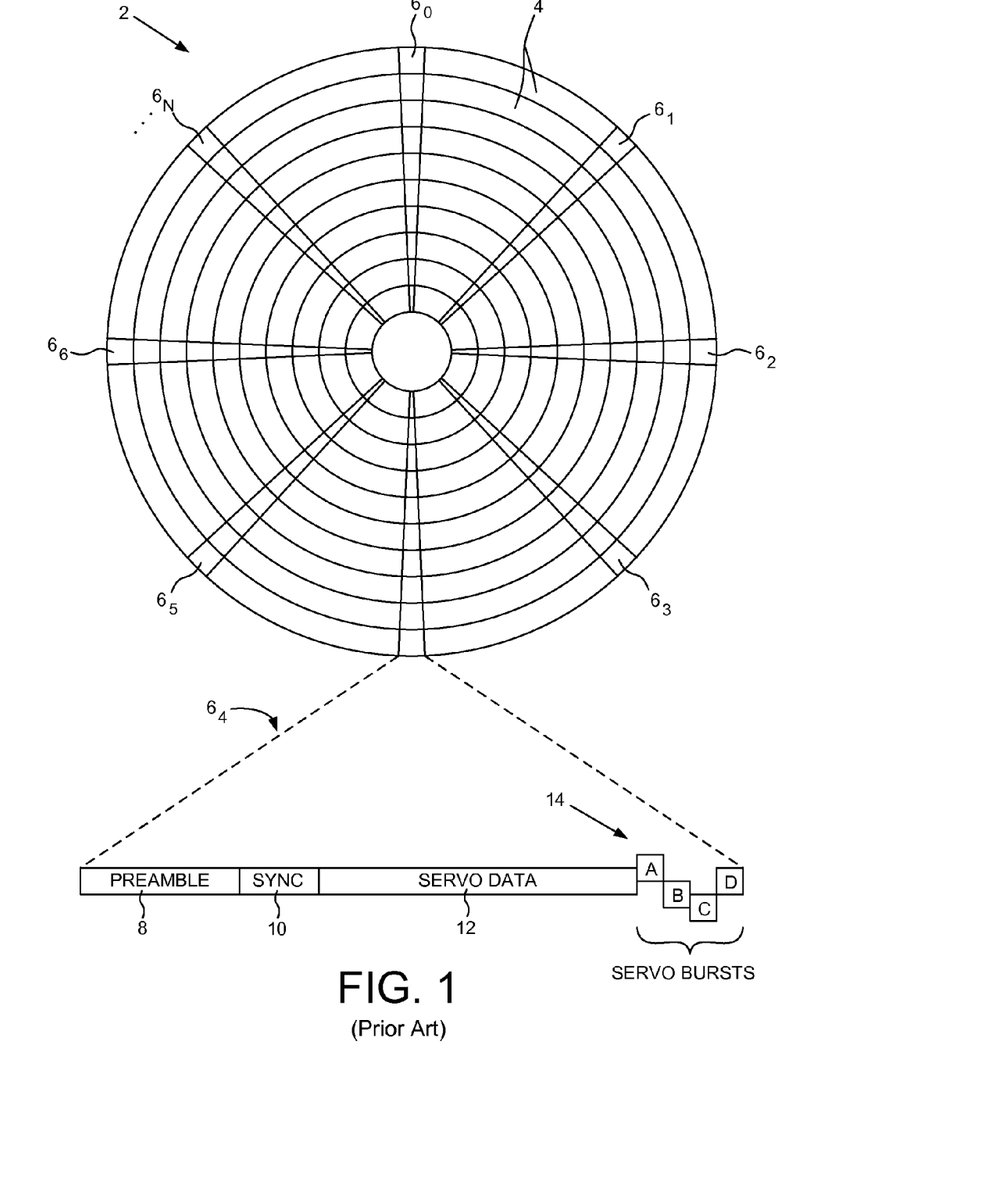
FIG. 1 shows a prior art disk format comprising a plurality of servo tracks defined by embedded servo sectors.

FIG. 1 shows a prior art disk format 2 comprising a number of servo tracks 4 defined by concentric servo sectors $6_0$-$6_N$ recorded around the circumference of each servo track, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. A dynamic fly height (DFH) servo controller may measure the fly height of the head and adjust the fly height actuator to maintain a target fly height during write/read operations.

Certain conditions may affect the ability of the VCM servo controller to maintain the head along the centerline of a target data track and/or the ability of the DFH servo controller to maintain the target fly height. For example, an external vibration applied to the disk drive or degradation and/or malfunction of the spindle motor that rotates the disks may induce a disturbance in the servo control systems. The degradation caused by such a disturbance may be ameliorated using a feed-forward compensation algorithm.

DETAILED DESCRIPTION OF EMBODIMENTS OF THE INVENTION

Figure 2A:
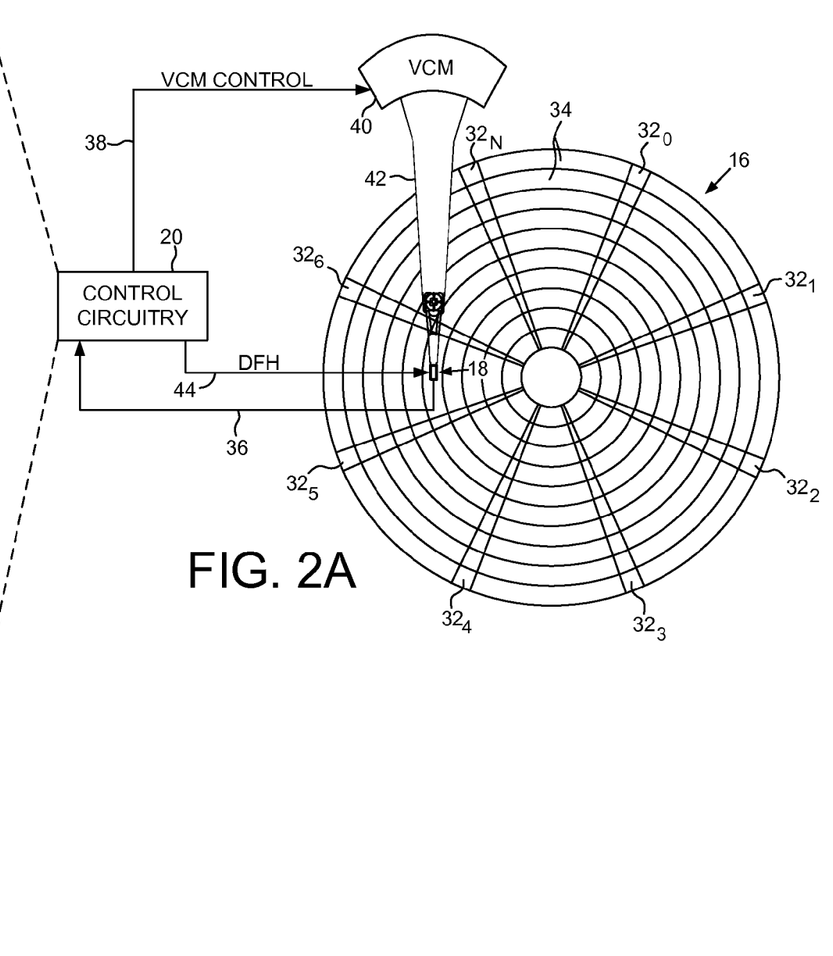
FIG. 2A shows a disk drive according to an embodiment of the present invention comprising a head actuated over a disk by a servo control system.

FIG. 2A shows a disk drive according to an embodiment of the present invention comprising a disk 16, a head 18, and control circuitry 20 comprising a servo control system operable to actuate the head 18 over the disk 16. The control circuitry 20 executes the flow diagram of FIG. 2B, wherein a plurality of disturbance signals is generated in response to a vibration (step 22). A plurality of correlations is generated in response to each disturbance signal and an error signal of the servo control system (step 24). At least one of the disturbance signals is selected in response to the correlations (step 26). A feed-forward compensation value is generated in response to the selected disturbance signal (step 28), and the feed-forward compensation value is applied to the servo control system to compensate for the vibration (step 30).

In the embodiment of FIG. 2A, the disk 16 comprises embedded servo sectors $32_0$-$32_N$ that define a plurality of servo tracks 34. The control circuitry 20 processes a read signal 36 emanating from the head 18 to demodulate the servo sectors $32_0$-$32_N$ and generate a position error signal (PES) representing an error between the actual position of the head and a target position relative to a target track. The control circuitry 20 filters the PES using a suitable compensation filter to generate a control signal 38 applied to a voice coil motor (VCM) 40 which rotates an actuator arm 42 about a pivot in order to actuate the head 18 radially over the disk in a direction that reduces the PES. The servo sectors $32_0$-$32_N$ may comprise any suitable position information, such as a track address for coarse positioning and servo bursts for fine positioning. The servo bursts may comprise any suitable pattern, such as the amplitude-based servo pattern shown in FIG. 1, or a suitable phase-based servo pattern.

In one embodiment, the disk drive comprises a suitable microactuator, such as a suitable piezoelectric actuator, for actuating the head 18 in fine movements radially over the disk 16. The microactuator may be implemented in any suitable manner, such as a microactuator that actuates a suspension relative to the actuator arm 42, or a microactuator that actuates a head gimbal relative to the suspension. In one embodiment, feed-forward compensation values may be generated in response to a selected disturbance signal for use in the microactuator servo control system in addition to, or instead of, generating feed-forward compensation values for the VCM servo control system.

In one embodiment, the head 18 may comprise a suitable fly height actuator, such as a heater or a piezoelectric actuator, operable to actuate the head vertically over the disk in order to maintain a target fly height. The control circuitry 20 may comprise a servo control system operable to compare a measured fly height to a target fly height to generate a fly height error used to generate a dynamic fly height (DFH) control signal 44 (FIG. 2A) similar to the servo control system that controls the radial position of the head. In one embodiment, feed-forward compensation values are generated in response to a selected disturbance signal for use in the fly height servo control system.

Figure 2B:
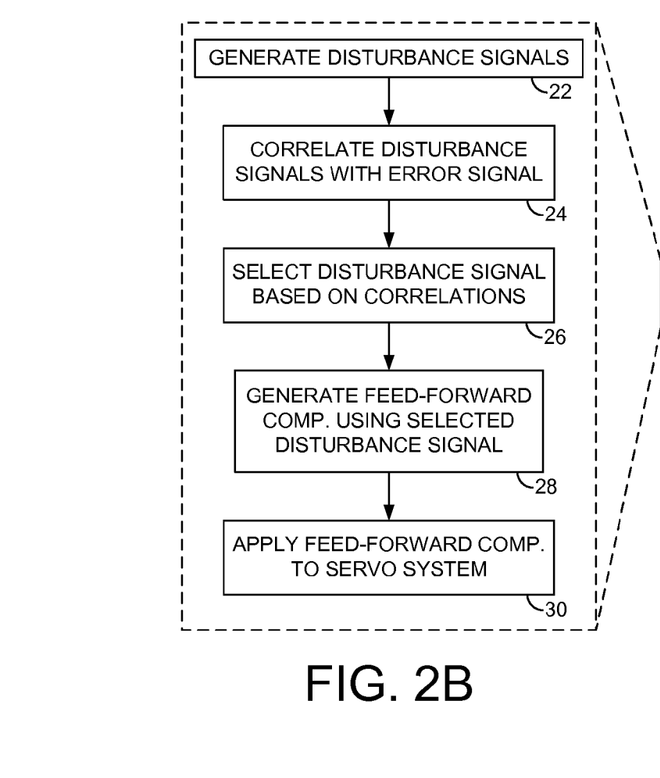
FIG. 2B is a flow diagram according to an embodiment of the present invention wherein a plurality of disturbance signals are correlated with an error signal in order to select at least one disturbance signal for feed-forward compensation.

An external vibration applied to the disk drive or degradation and/or malfunction of the spindle motor that rotates the disks may induce a disturbance in one or more of the servo control systems that actuate the head over the disk (radially or vertically). Using a suitable sensor a disturbance signal can be generated that represents the disturbance; however, since the disturbance may be caused by a number of different sources, in embodiments of the present invention a number of sensors are employed each corresponding to a possible source of vibration. The disturbance signals generated by the sensors are evaluated in order to select the optimal disturbance signal (s), that is, the disturbance signal(s) that best represent(s) the actual vibration. In the embodiment of FIG. 2B, the disturbance signal having the best correlation with an error signal in the servo control system is selected to generate the feed-forward compensation values. In other embodiments described below with reference to FIGS. 7A and 7B, the disturbance signal that generates a smallest residual error (after feed-forward compensation) is selected to generate the feed-forward compensation values applied to the actual servo control system.

Figure 3A:
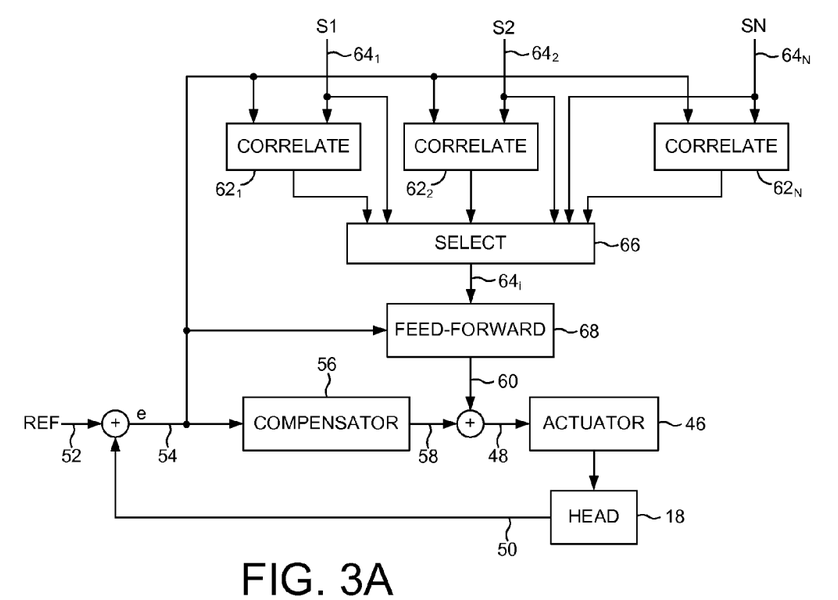
FIG. 3A shows a servo control system according to an embodiment of the present invention including feed-forward compensation generated from a selected disturbance signal.

FIG. 3A shows a servo control system according to an embodiment of the present invention, including to select a disturbance signal based on a correlation with an error signal in the servo control system. A suitable actuator 46 (radial or vertical) actuates the head 18 over the disk 16 in response to an actuator control signal 48. An estimated position 50 of the head 18 is subtracted from a reference position 52 to generate an error signal 54. A suitable compensator 56 processes the error signal 54 to generate a control signal 58 that is combined with a feed-forward compensation value 60 to generate the actuator control signal 48. A plurality of correlators $62_1$-$62_N$ correlate the error signal 54 with respective disturbance signals $64_1$-$64_N$. A selector 66 applies the disturbance signal $64_i$ that best correlates with the error signal 54 to a feed-forward algorithm 68 that generates the feed-forward compensation values 60 that compensate for the vibration disturbing the servo control system.

Figure 3B:
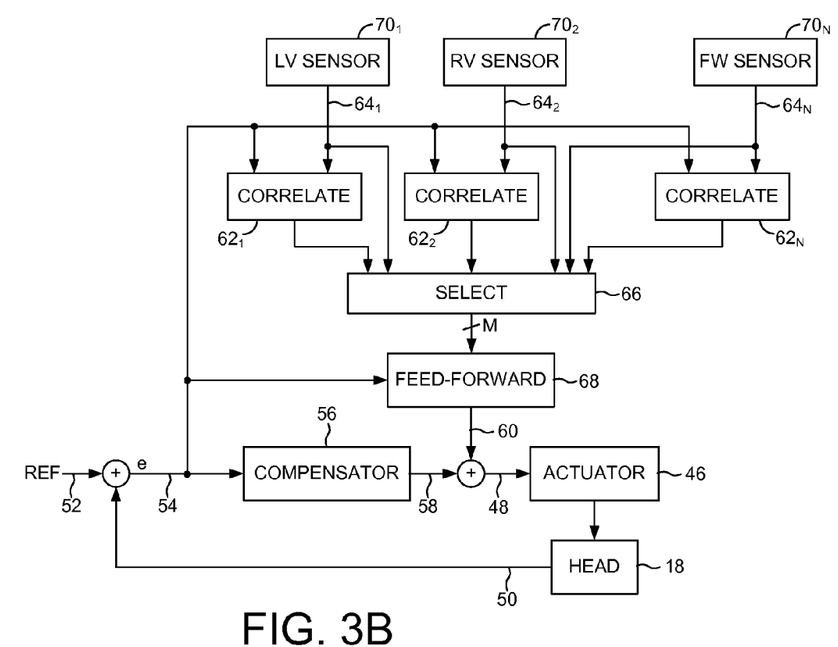
FIG. 3B shows a servo control system according to an embodiment of the present invention including feed-forward compensation generated from a plurality of selected disturbance signals.

Any suitable sensor may be used to generate the disturbance signals $64_1$-$64_N$ in the embodiments of the present invention, including an electronic sensor and/or a sensor implemented in firmware. FIG. 3B shows an embodiment wherein the sensors include a first electrical sensor $70_1$ (e.g., an accelerometer) for generating a first disturbance signal $64_1$ representing a linear vibration, and a second electrical sensor $70_2$ for generating a second disturbance signal $64_2$ representing a rotational vibration. Also in this embodiment a firmware sensor $70_N$ generates a disturbance signal $64_N$, for example, in response to the read signal 36 emanating from the head, or in response to a back electromotive force (BEMF) signal generated by the VCM 40 or a spindle motor that rotates the disk 16, or in response to any other suitable signal that may affect the servo control system(s).

FIG. 3B also illustrates an embodiment wherein the selector 66 may apply a plurality of the disturbance signals (M disturbance signals) to the feed-forward algorithm for generating the feed-forward compensation values 60. For example, the selector 66 may select the best M out of the N disturbance signals, or the M disturbance signals that satisfy a selection criteria (e.g., exceed a threshold).

Figure 4:
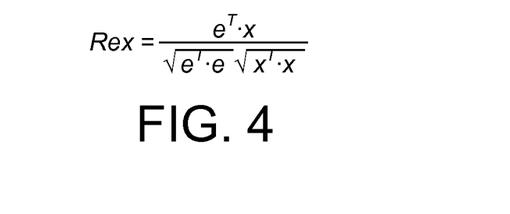
FIG. 4 shows an equation for correlating a disturbance signal with the error signal according to an embodiment of the present invention.

Any suitable algorithm may be employed by the correlators $62_1$-$62_N$ to correlate the disturbance signals $64_1$-$64_N$ with the error signal 54. FIG. 4 shows an example correlation algorithm where e represents the error signal and x represents the disturbance signal. Other embodiments may employ a different algorithm to compute the correlation, such as computing a Euclidean Distance between the error signal and the disturbance signals.

Figure 5:
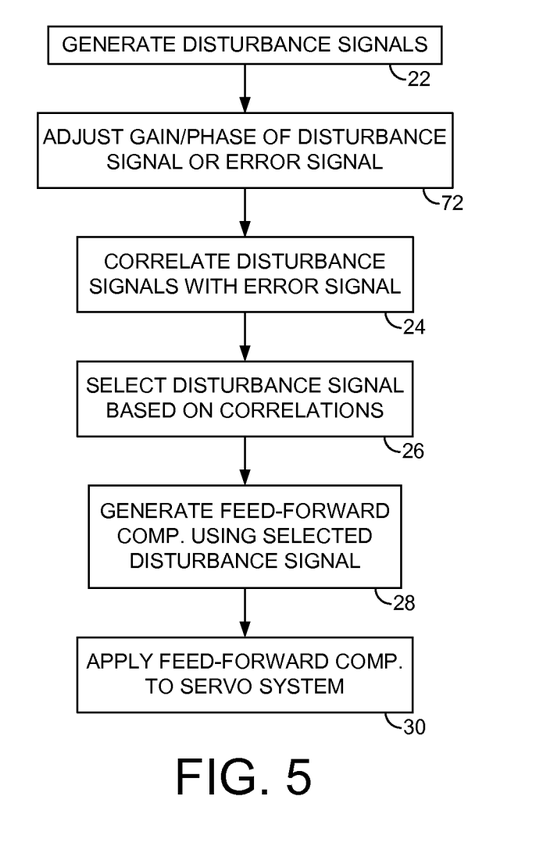
FIG. 5 is a flow diagram according to an embodiment of the present invention wherein at least one of a gain and phase of at least one of the disturbance signal and the error signal is adjusted prior to computing the correlation.

In an embodiment illustrated in the flow diagram of FIG. 5, the gain of at least one of each disturbance signal and the error signal may be adjusted (step 72) prior to performing the correlation (step 24). In one embodiment, the gain may be adjusted to a number of different values for each disturbance signal and the corresponding correlation computed. Also in the embodiment of FIG. 5, the phase of at least one of each disturbance signal and the error signal may be adjusted (step 72) prior to performing the correlation (step 24). For example, the phase may be adjusted to a number of different values for each disturbance signal and the corresponding correlation computed. The disturbance signal(s) that best correlates with the error signal at each of the amplitude and phase values is selected to generate the feed-forward compensation values applied to the servo control system. In an alternative embodiment, the correlation is computed as a normalized correlation (e.g., using the equation shown in FIG. 4) to account for a difference in gain between each disturbance signal and the error signal.

Figure 6A:
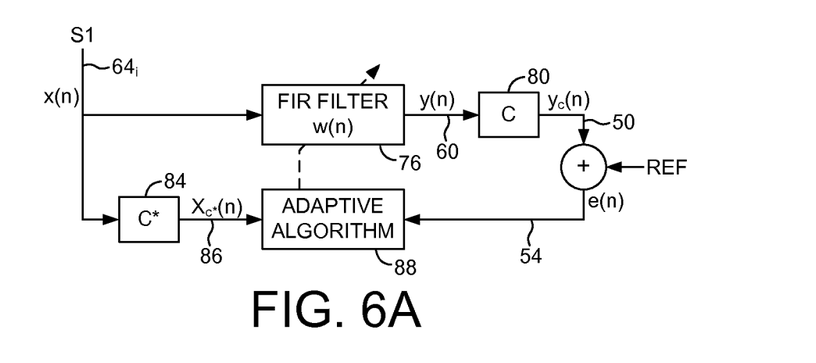
FIG. 6A shows an embodiment of the present invention for generating the feed-forward compensation values from a selected disturbance signal.

Any suitable algorithm may be employed to generate the feed-forward compensation values in response to the selected disturbance signal. FIG. 6A shows an embodiment of the present invention for adaptively generating feed-forward compensation values. The selected disturbance signal S1 $64_i$ comprises a sequence of digital values x(n) that is filtered by a finite impulse response (FIR) filter 76 to generate feed-forward compensation values y(n) 60 applied to the plant C 80 representing the actuator 46. The output $y_c(n)$ 50 of the plant C 80 is subtracted from a reference to generate an error signal e(n) 54 (e.g., the PES of the VCM servo control system). The digital values x(n) of the selected disturbance signal S1 $64_i$ are applied to a model C* 84 of the plant C 80 to generate a sequence of digital values $X_{C*}(n)$ 86 representing the estimated effect the digital values x(n) 74 have on the plant C 80. An adaptive algorithm 88 processes the digital values $X_{C*}(n)$ 86 and the error signal e(n) 54 in order to adapt the FIR filter 76 toward a state that minimizes the error signal e(n) 54. In one embodiment, the goal is to minimize a cost function $J(n)=E[e(n)^2]$, where:

$$y(n) = w^T(n)x(n)$$

$$e(n) = d(n) - y_c(n)$$

$$x_{c^*}(n) = \begin{bmatrix} \sum_{i=0}^{I-1} c_i^* x(n-i) \\ \sum_{i=0}^{I-1} c_i^* x(n-i-1) \\ \vdots \\ \sum_{i=0}^{I-1} c_i^* x(n-i-M-1) \end{bmatrix}$$

In the above equations, d(n) represents the reference signal an w represents the vector of coefficients in the FIR filter 76. To find the optimal coefficients of the FIR filter the gradient method is used as described by:

$$\nabla_{w(n)} J(n) = 2E[e(n)\nabla_{w(n)} e(n)]$$

which results in $$w(n+1) = \gamma w(n) + \mu x_{x^*}(n) e(n)$$

where γ represents the leakage factor and µ represents the step size. The above described adaption algorithm is based on a known filtered-X LMS algorithm. However, the feed-forward compensation values may be generated using any suitable algorithm.

Figure 6B:
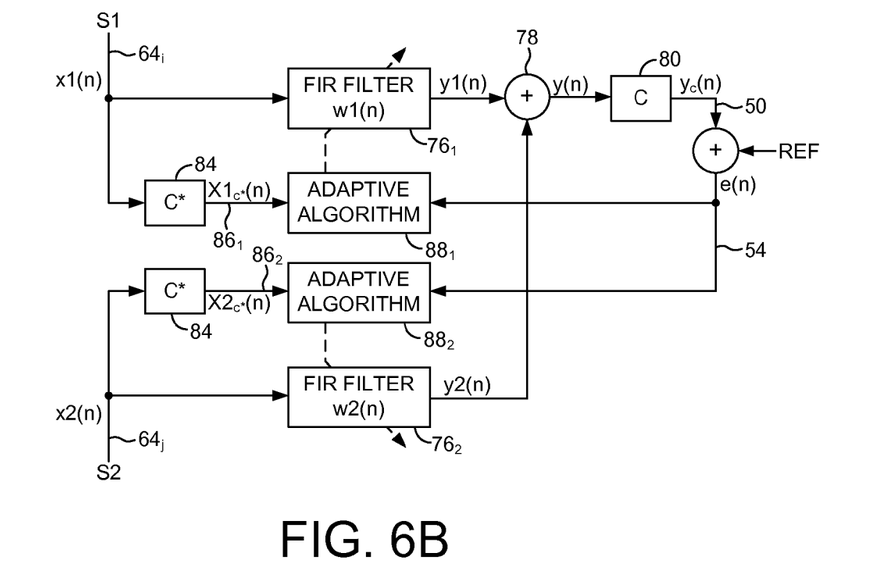
FIG. 6B shows an embodiment of the present invention for generating the feed-forward compensation values from a plurality of selected disturbance signals.

FIG. 6B shows an embodiment of the present invention wherein the feed-forward compensation values are generated in response to two selected disturbance signals S1 and S2. The embodiment of FIG. 6B uses the same adaptive feed-forward algorithm as in FIG. 6A for each of the disturbance signals S1 and S2, and the outputs of the respective FIR filters $76_1$ and $76_2$ are combined 78 to generate the feed-forward compensation values 60 applied to the actuator 46 (the plant 80).

In another embodiment of the present invention, the optimal disturbance signal(s) that will optimize the feed-forward compensation are selected by evaluating a residual error of the servo control system. First feed-forward compensation values are generated in response to a first disturbance signal and an error signal of the servo control system. A first residual error is generated in response to the first feed-forward compensation values and an output of the servo control system. Second feed-forward compensation values are generated in response to a second disturbance signal and the error signal of the servo control system. A second residual error is generated in response to the second feed-forward compensation values and the output of the servo control system. At least one of the disturbance signals is selected in response to the first and second residual errors. Third feed-forward compensation values are generated in response to the selected disturbance signal, and the third feed-forward compensation values are applied to the servo control system to compensate for a vibration.

Figure 7A:
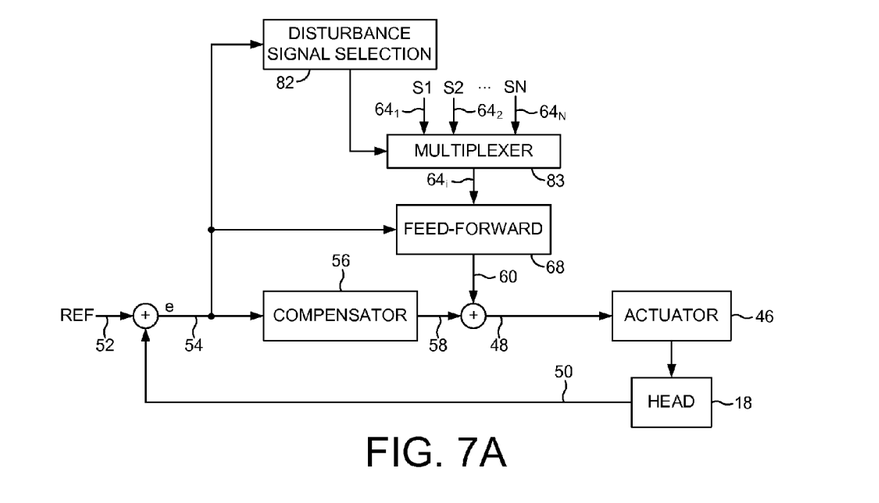
FIG. 7A shows an embodiment of the present invention wherein the disturbance signal selection is based on a residual error after performing feed-forward compensation of the servo control system.

FIG. 7A shows an embodiment of the present invention for selecting the disturbance signal(s) that will optimize the feed-forward compensation based on a residual error of the servo control system. In this embodiment, each of the disturbance signals $64_1$-$64_N$ is selected 82 one at a time (by configuring multiplexer 83) and used to generate 68 the feed-forward compensation values 60 applied to the servo control system. A residual error is generated based on the error signal 54 after performing feed-forward compensation for a period of time. After selecting each disturbance signal to generate the feed-forward compensation values 60 and generating a corresponding residual error, the disturbance signal(s) that generates the smallest residual error is selected 82 to generate 68 the feed-forward compensation values 60 during normal operation.

Figure 7B:
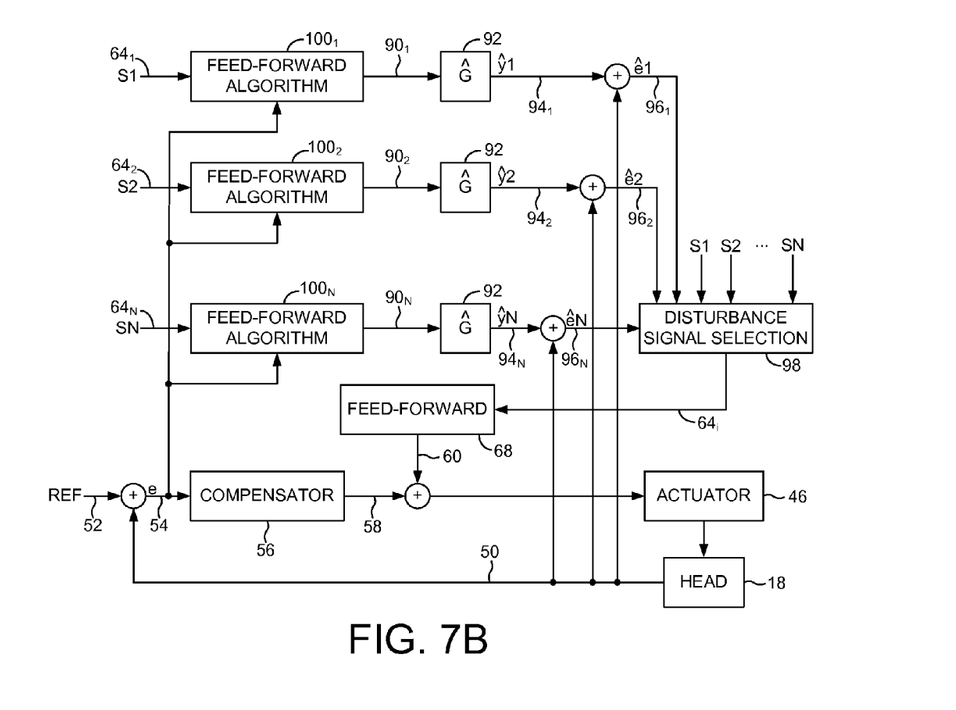
FIG. 7B shows an embodiment of the present invention wherein the disturbance signal selection is based on a residual error after performing feed-forward compensation of a model of at least part of the servo control system.

FIG. 7B shows an alternative embodiment of the present invention for selecting the disturbance signal(s) that will optimize the feed-forward compensation based on a residual error of the servo control system. In this embodiment, first feed-forward compensation values $90_1$ are generated in response to a first disturbance signal $64_1$ and an error signal 54 of the servo control system. The first feed-forward compensation values $90_1$ are applied to a model 92 of at least part of the servo control system to generate a first model output $94_1$. A first residual error $96_1$ is generated in response to an output 50 of the servo control system and the first model output $94_1$. Second feed-forward compensation values $90_2$ are generated in response to a second disturbance signal $64_2$ and the error signal 54 of the servo control system. The second feed-forward compensation values $90_2$ are applied to the model 92 of at least part of the servo control system to generate a second model output $94_2$. A second residual error $96_2$ is generated in response to the output 50 of the servo control system and the second model output $94_2$. At least one of the disturbance signals $64_1$-$64_N$ is selected 98 in response to the residual errors $94_1$-$94_N$. A feed-forward compensation value 60 is generated in response to the selected disturbance signal $64_i$, and the feed-forward compensation value 60 is applied to the servo control system to compensate for a vibration.

In the embodiment of FIG. 7B, the feed-forward compensation values $90_1$-$90_N$ generated by the feed-forward algorithms $100_1$-$100_N$ drive the model outputs $94_1$-$94_N$ toward the output of the servo system 50. The disturbance signal(s) that correlate well with the error signal 54 will generate the model output 94 closest to the output 50 of the servo control system, thereby minimizing the residual error 96. Accordingly, in one embodiment the disturbance signal that generates the smallest residual error 96, or the M disturbance signals that generate a residual error 96 smaller than a threshold, are selected to generate the feed-forward compensation values 60 applied to the servo control system.

In one embodiment, when executing the algorithm for selecting the disturbance signals $64_1$-$64_N$, the feed-forward compensation of the servo control system is disabled. With the feed-forward compensation disabled, the effect of a vibration on the servo control system will manifest directly in the error signal 54 so that, for example, each of the disturbance signals $64_1$-$64_N$ may be correlated directly with the error signal 54 as illustrated in the embodiment of FIG. 3A. After selecting the optimal disturbance signal(s) in response to the correlations, the feed-forward compensation is enabled using the selected disturbance signal(s).

Figure 8:
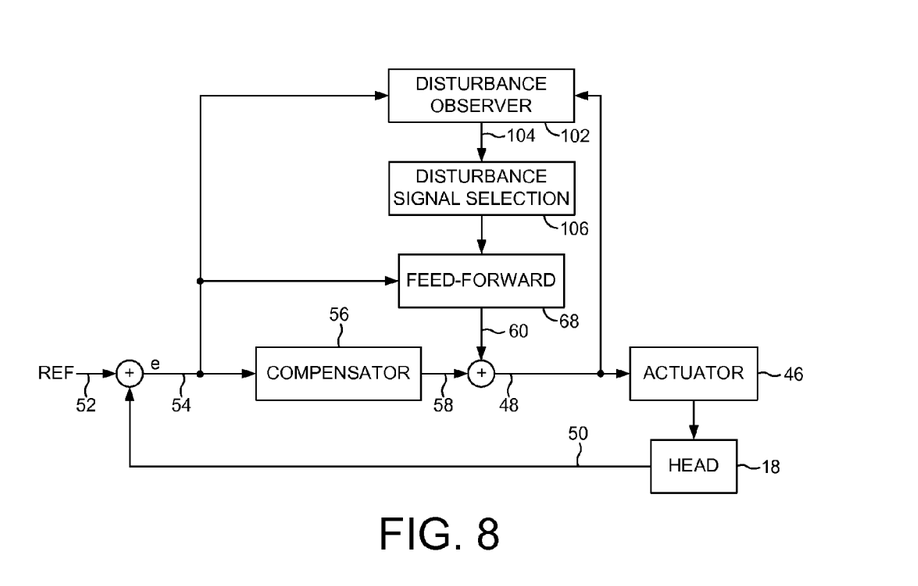
FIG. 8 shows an embodiment of the present invention wherein a disturbance observer generates the error signal of the servo control system that is used to select the optimal disturbance signal(s) for feed-forward compensation.

In another embodiment, the feed-forward compensation is enabled while evaluating the disturbance signals $64_1$-$64_N$. For example, a first disturbance signal may be selected for feed-forward compensation while the disk drive is subjected to a first type of vibration. Over time the type of vibration may change (due a change in operating conditions) so that the first disturbance signal may no longer correlate well with the error signal 54. Accordingly, in one embodiment the control circuitry may execute the algorithm for selecting the disturbance signals $64_1$-$64_N$ while the disk drive is operating normally, and change the selected disturbance signal(s) over time to adapt to changes in operating conditions. However, when the feed-forward compensation is enabled there will be at least some compensation of a different vibration using the currently selected disturbance signal. Therefore, in an embodiment shown in FIG. 8 a disturbance observer 102 may be employed to estimate the effect of a vibration on the servo control system. The disturbance observer 102 evaluates the control signal 48 applied to the actuator 46 in order to estimate the degree to which the feed-forward compensation is compensating for the current vibration. The degree to which the feed-forward compensation is not compensating for the vibration will be reflected as a residual error in the error signal 54. The disturbance observer 102 combines these signals to generate an error signal 104 that is used by the disturbance signal selection algorithm 106 to change the selected disturbance signal(s) over time to account for changes in the vibrations.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk;
    a head; and
    control circuitry comprising a servo control system operable to actuate the head over the disk, the control circuitry operable to:
        generate a plurality of disturbance signals in response to a vibration;
        generate a plurality of correlations in response to each disturbance signal and an error signal of the servo control system;
        select at least one of the disturbance signals in response to the correlations;
        generate a feed-forward compensation value in response to the selected disturbance signal; and
        apply the feed-forward compensation value to the servo control system to compensate for the vibration.

2. The disk drive as recited in claim 1, wherein the servo control system actuates the head radially over the disk.

3. The disk drive as recited in claim 2, wherein the error signal represents a difference between a measured radial location and a reference radial location.

4. The disk drive as recited in claim 1, wherein the servo control system actuates the head vertically over the disk.

5. The disk drive as recited in claim 4, wherein the error signal represents a difference between a measured fly height and a reference fly height.

6. The disk drive as recited in claim 1, wherein the control circuitry comprises an electrical sensor operable to generate at least one of the disturbance signals.

7. The disk drive as recited in claim 6, wherein the control circuitry comprises:
    a first electrical sensor operable to generate a first disturbance signal representing a linear vibration; and
    a second electrical sensor operable to generate a second disturbance signal representing a rotational vibration.

8. The disk drive as recited in claim 1, wherein the control circuitry is operable to generate at least one of the disturbance signals in response to a read signal emanating from the head.

9. The disk drive as recited in claim 1, wherein the control circuitry is operable to correlate a first disturbance signal with the error signal according to:

$$Rex = \frac{e^T \cdot x}{\sqrt{e^T \cdot e} \sqrt{x^T \cdot x}}$$

where:
e represents the error signal; and
x represents the first disturbance signal.

10. The disk drive as recited in claim 1, wherein the control circuitry is operable to adjust at least one of a gain and phase of at least one of each disturbance signal and the error signal prior to correlating each disturbance signal with an error signal.

11. The disk drive as recited in claim 1, wherein the control circuitry is further operable to:
    select a plurality of the disturbance signals in response to the correlation generated for each disturbance signal; and
    generate the feed-forward compensation value in response to the selected disturbance signals.

12. A method of operating a disk drive comprising a disk, a head, and a servo control system operable to actuate the head over the disk, the method comprising:
    generating a plurality of disturbance signals in response to a vibration;
    generating a plurality of correlations in response to each disturbance signal and an error signal of the servo control system;
    selecting at least one of the disturbance signals in response to the correlations;
    generating a feed-forward compensation value in response to the selected disturbance signal; and
    applying the feed-forward compensation value to the servo control system to compensate for the vibration.

13. The method as recited in claim 12, wherein the servo control system actuates the head radially over the disk.

14. The method as recited in claim 13, wherein the error signal represents a difference between a measured radial location and a reference radial location.

15. The method as recited in claim 12, wherein the servo control system actuates the head vertically over the disk.

16. The method as recited in claim 15, wherein the error signal represents a difference between a measured fly height and a reference fly height.

17. The method as recited in claim 12, wherein the disk drive comprises an electrical sensor operable to generate at least one of the disturbance signals.

18. The method as recited in claim 17, wherein the disk drive comprises:
    a first electrical sensor operable to generate a first disturbance signal representing a linear vibration; and a second electrical sensor operable to generate a second disturbance signal representing a rotational vibration.

19. The method as recited in claim 12, further comprising generating at least one of the disturbance signals in response to a read signal emanating from the head.

20. The method as recited in claim 12, further comprising correlating a first disturbance signal with the error signal according to:

$$Rex = \frac{e^T \cdot x}{\sqrt{e^T \cdot e} \sqrt{x^T \cdot x}}$$

where:
e represents the error signal; and
x represents the first disturbance signal.

21. The method as recited in claim 12, further comprising adjusting at least one of a gain and phase of at least one of each disturbance signal and the error signal prior to correlating each disturbance signal with an error signal.

22. The method as recited in claim 12, further comprising:
selecting a plurality of the disturbance signals in response to the correlation generated for each disturbance signal; and
generating the feed-forward compensation value in response to the selected disturbance signals.

* * * * *